United States Patent
Kim

(10) Patent No.: US 8,787,938 B2
(45) Date of Patent: Jul. 22, 2014

(54) LOCATION INFORMATION TAGGING METHOD AND APPARATUS FOR LOCATION-BASED SERVICE IN WIRELESS COMMUNICATION SYSTEM

(75) Inventor: Dae Joong Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 782 days.

(21) Appl. No.: 12/648,089

(22) Filed: Dec. 28, 2009

(65) Prior Publication Data

US 2010/0167760 A1    Jul. 1, 2010

(30) Foreign Application Priority Data

Dec. 29, 2008 (KR) .................. 10-2008-0135306

(51) Int. Cl.
*H04W 24/00* (2009.01)
(52) U.S. Cl.
USPC .................. 455/456.3; 455/456.1
(58) Field of Classification Search
USPC .............. 455/456.3, 404.2, 414.2, 414.3
See application file for complete search history.

(56) References Cited

U.S. PATENT DOCUMENTS

| 2002/0103936 A1* | 8/2002 | Jano et al. ............... 709/246 |
| 2004/0235493 A1* | 11/2004 | Ekerborn ................ 455/456.1 |
| 2007/0232323 A1* | 10/2007 | Spriestersbach ......... 455/456.1 |

FOREIGN PATENT DOCUMENTS

| EP | 1 469 689 A2 | 10/2004 |
| KR | 10-2006-0041001 A | 5/2006 |
| KR | 10-0784288 B1 | 12/2007 |

* cited by examiner

*Primary Examiner* — Erika A Washington
(74) *Attorney, Agent, or Firm* — Jefferson IP Law, LLP

(57) ABSTRACT

A location information tagging method and system for location-based services in a wireless communication system are provided. In the method, if it is determined that a service request message received from a device is being sent to an application server for providing a service based on a location of the device, location information about a base station is tagged to the service request message. The service request message with the tagged location information is transmitted to the application server. Therefore, the application server can obtain location information about the device by merely depending on the message received from the device without referring to a conventional location service server. This reduces a service response time and also rapidly offers a location-based service.

13 Claims, 3 Drawing Sheets

LOCATION INFORMATION TAGGING METHOD AND APPARATUS FOR LOCATION-BASED SERVICE IN WIRELESS COMMUNICATION SYSTEM

PRIORITY

This application claims the benefit under 35 U.S.C. §119(a) of a Korean patent application filed in the Korean Intellectual Property Office on Dec. 29, 2008 and assigned Serial No. 10-2008-0135306, the entire disclosure of which are hereby incorporated by reference.

BACKGROUND OF THE INVENTION

1. Field of the Invention

The present invention relates to a location information providing technology. More particularly, the present invention relates to an apparatus and for tagging location information about a mobile device to a service request message which is transmitted to an application server for location-based services.

2. Description of the Related Art

A wireless communication system may provide a variety of location-based services using location information about a mobile device or a user. For example, it is possible to find locations near a user of the mobile device such as a parking place, a post office, a bus stop, a restaurant, a store, etc. given a user's current location. In addition, a map service or a navigation service may be provided considering a user's current location, and a local advertisement or event information may be offered depending on a user's current location.

Various approaches to the acquisition of a device location have been widely studied in the art. A mobile device having a Global Positioning System (GPS) module may obtain its location information from GPS satellites, and a mobile device having no GPS module may determine its current location by measuring a signal strength from a base station in a mobile communication network. Additionally, some applications may offer useful services to a user using only location information about a base station accessed by a mobile device. More particularly, in a recently emerging wireless communication network using femtocells or picocells, a spatial resolution between locations of a base station and a user is reduced to within several meters or tens of meters.

Generally, a server which obtains location information about mobile devices and provides it to others may be referred to as a LoCation Service server (hereinafter, an LCS server). In addition, an LCS client, which receives location information about devices from the LCS server and thereby provides location-based services to a user, may be referred to as an application server.

Location-based services, which are standardized in the 3rd Generation Partnership Project (3GPP) and the Open Mobile Alliance (OMA), depend on an LCS server. The application server transmits a location request message to the LCS server so as to request location information about a mobile device which is required for providing services to a user. The LCS server transmits a location response message to the application server so as to offer the required location information about the mobile device. In case of having no location information about the required device, the LCS server must refer to another LCS server or must perform procedures for determining a location of the user device. Unfortunately, this may often cause a serious delay in sending the location response message. Accordingly, there is a need for an improved apparatus and method for determining a location of a user device.

SUMMARY OF THE INVENTION

An aspect of the present invention is to address the above-mentioned problems and/or disadvantages and to provide at least the advantages described below. Accordingly, an aspect of the present invention is to provide a location-based service in which a base station directly offers location information about a required mobile device to an application server, without requiring that the application server receive such location information from a location service server.

Another aspect of the present invention is to reduce construction costs of infrastructures for location-based services, to facilitate the development of an application server for location-based services, and to offer various and high-quality location-based services to a user.

In accordance with an aspect of the present invention, a location information tagging method for a location-based service in a wireless communication system is provided. The method includes determining whether a service request message received from a device is being sent to an application server for providing a service based on a location of the device, if it is determined that the service request message is being sent to the application server, tagging location information about a base station to the service request message, and transmitting the service request message with the tagged location information to the application server.

In accordance with another aspect of the present invention, a location information tagging method for a location-based service in a wireless communication system is provided. The method includes determining whether a service request message is going to be sent from a device to an application server for providing a service based on a location of the device, if it is determined that the service request message is going to be sent to the application server, tagging location information about the device to the service request message, and transmitting the service request message with the tagged location information to the application server.

In accordance with still another aspect of the present invention, a location information tagging apparatus for a location-based service in a wireless communication system is provided. The apparatus includes an application server table storage unit for storing information about an application server for providing a service based on a location of a device, a packet examination unit for determining whether a service request message received from the device is being sent to the application server, and a tagging execution unit for tagging location information about a base station to the service request message if it is determined that the service request message is being sent to the application server.

In accordance with yet another aspect of the present invention, a location information tagging apparatus for a location-based service in a wireless communication system is provided. The apparatus includes an application server table storage unit for storing information about an application server for providing a service based on a location of a device, a packet examination unit for determining whether a service request message is going to be sent to the application server, and a tagging execution unit for tagging location information about the device to the service request message if it is determined that the service request message is going to be sent to the application server.

Aspects of the present invention may reduce a service response time and more rapidly offer a service since an application server does not need to refer to a location service server but instead depends on a message a device sends to obtain its location information.

In addition, aspects of the present invention may allow a wireless communication network operator to provide location-based services by using only the existing base station system without adding any infrastructure thereto. Furthermore, since location-based services may be provided regardless of the existence of a Global Positioning System (GPS) module in a device, such location-based services may be expected to spread easily and widely.

Furthermore, aspects of the present invention may provide location-based services in the same manner to users in a wired communication system as well as a wireless communication system.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Furthermore, well known or widely used techniques, elements, structures, and processes may not be described or illustrated in detail to avoid obscuring the essence of the present invention. Although the drawings represent exemplary embodiments of the invention, the drawings are not necessarily to scale and certain features may be exaggerated or omitted in order to better illustrate and explain the present invention.

Figure 1:
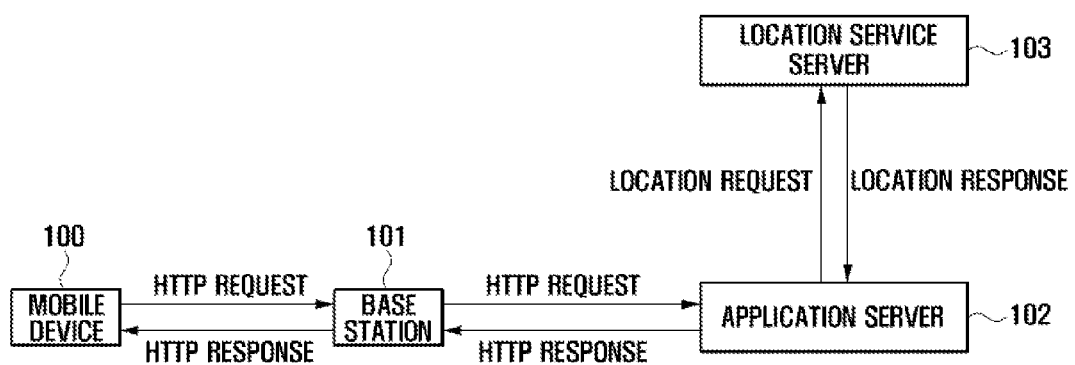
FIG. 1 is a block diagram which illustrates a configuration of a conventional wireless communication system for providing a location-based service.

FIG. 1 is a block diagram which illustrates a configuration of a conventional wireless communication system for providing a location-based service.

Referring to FIG. 1, the conventional wireless communication system includes a mobile device 100, a base station 101, an application server 102, and a location service server 103.

The mobile device 100 transmits a HyperText Transfer Protocol (HTTP) request message to the application server 102, which provides location-based services, through the base station 101 and necessary gateways. The application server 102 requests, using a source Internet Protocol (IP) address contained in the HTTP request message, the location service server 103 to provide location information about the device 100. That is, whenever location information about the device 100 is required, the application server 102 requests location information about the device 100 by sending a location request message to the location service server 103.

In order to determine the required location information about the device 100, the location service server 103 may use any of well known location measuring techniques for a mobile communication network. Alternatively, if a certain device belongs to an administrative domain of another location service server, the location service server 103 may ask for assistance from that server. In this case, a communication between the location service servers complies with the Roaming Location Protocol (RLP) interface defined by the Open Mobile Alliance (OMA).

A communication between the application server 102 and the location service server 103 complies with the Mobile Location Protocol (MLP) defined by the OMA. Therefore, the application server 102 should offer identification information about the device, such as an International Mobile Station Identity (IMSI) or an IP address, to the location service server 103 through an MLP location request message. However, in a case in which a Network Address Translation (NAT) technology is applied to an IP address of the device, such an IP address can no longer be used as identification information about the device. In addition, the act of offering identification information such as IMSI to the application server 102 may not be desirable due to its lack of adequate security.

Utilizing the location service server 103 as a location information provider requires a request and response process between the application server 102 and the location service server 103. The application server 102 should have a specific identifier of the device 100 so as to acquire location information about the device 100 from the location service server 103. However, a source IP address in a message received from the device 100 may fail to adequately specify the device 100. This is since the mobile communication network may adopt the NAT technology for reasons of insufficient IP address or security. The use of IMSI as an identifier of the device 100 may be alternatively considered. However, securely delivering IMSI information from the device 100 to the application server 102 may be difficult and may also increase service costs.

Accordingly, a conventional technique utilizing the location service server 103 may fail to guarantee a reliable quality of service. Furthermore, since the location of the device 100 varies in a mobile communication system, it is not easy for the location service server 103 to consistently determine the current location of the device 100 with great accuracy. Therefore, to determine the location of the device 100, the location service server 103 should perform location determination procedures required between the location service server 103 and the device 100. As a result, a delay may occur until the application server 102 receives necessary location information about the device 100 from the location service server 103. Such a delay may have unfavorable consequences.

Figure 2:
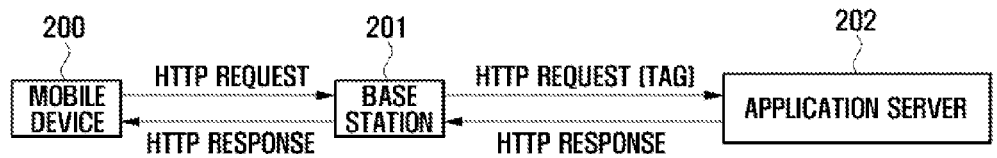
FIG. 2 is a block diagram which illustrates a configuration of a wireless communication system for providing a location-based service according to an exemplary embodiment of the present invention.

FIG. 2 is a block diagram which illustrates a configuration of a wireless communication system for providing a location-based service according to an exemplary embodiment of the present invention.

Referring to FIG. 2, the wireless communication system includes a mobile device 200, a base station 201, and an application server 202. According to an exemplary embodiment of the invention, the base station 201 tags location information about the device 200 to a packet received from the device 200, and then directly provides the tagged packet to the application server 202.

The mobile device 200, which may use web services, transmits an HTTP request message to the application server 202 via the base station 201 and receives an HTTP response message from the application server 202. The HTTP request message received by the application server 202 contains location information about the device 200, so the application server 202 may not need to request additional location information. That is, the application server 202 may provide location-based services, depending on the HTTP request message to which location information of the device 200 is tagged.

In an exemplary embodiment, the base station 201 provides its own location information as location information about the device 200. Since the base station 201 may be a femtocell or picocell, its coverage range as a location resolution may be limited to several meters or tens of meters. Therefore, location information about the base station 201 can be favorably and sufficiently used as location information about the device 200.

Figure 3:
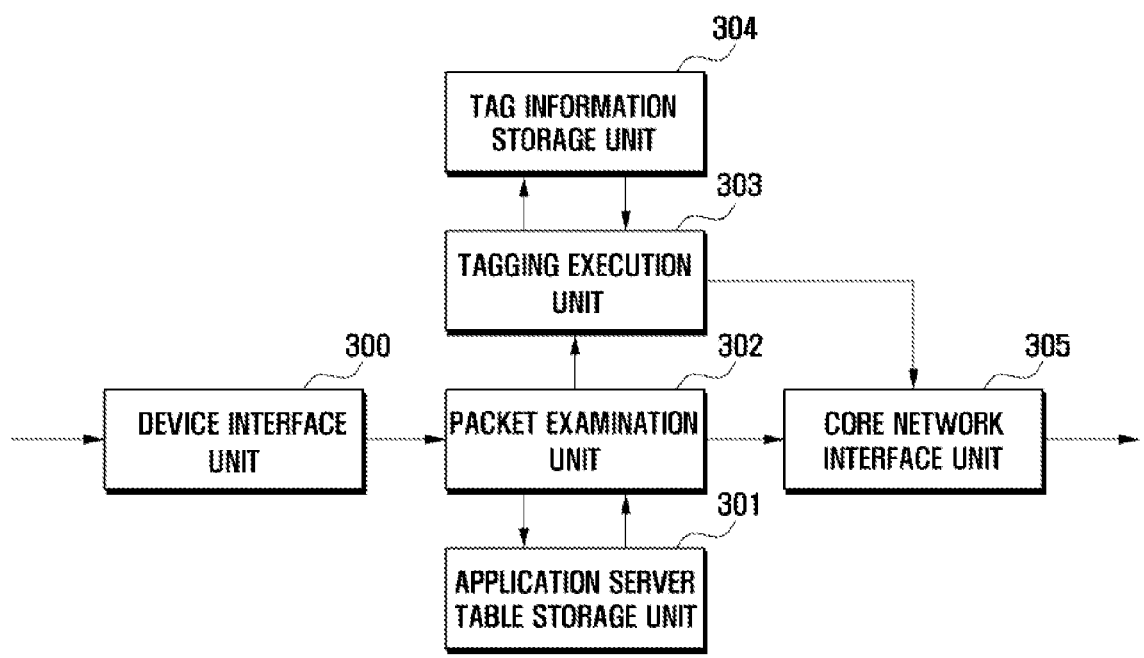
FIG. 3 is a block diagram which illustrates a configuration of an apparatus for tagging location information of a mobile device to a message in a wireless communication system according to an exemplary embodiment of the present invention.

FIG. 3 is a block diagram which illustrates a configuration of an apparatus for tagging location information of a mobile device to a message in a wireless communication system according to an exemplary embodiment of the present invention.

Referring to FIG. 3, the tagging apparatus for location information includes a device interface unit 300, an application server table storage unit 301, a packet examination unit 302, a tagging execution unit 303, a tag information storage unit 304, and a core network interface unit 305. These units may be formed in a node, such as an evolved Node B (eNB) or a Packet Data Network GateWay (PDN-GW), which is located on a packet transmission path between the device and the application server. In an exemplary implementation, the eNB may provide Quality of Service (QoS) information such as a bandwidth of a wireless environment, together with location information about the device. Furthermore, in a case in which extended data exchange between the device and the eNB is possible, the eNB may further provide detailed information such as a phone type and a display size of the device. In the following description, the tagging apparatus for location information is configured in the eNB of a mobile communication network. However, it is to be understood that this is merely for ease of explanation and not to be considered as limiting.

The device interface unit 300 is an element for processing basic functions of the eNB such as Medium Access Control (MAC), Radio Link Control (RLC), Packet Data Convergence Protocol (PDCP), etc. The core network interface unit 305 is an element for processing basic functions, such as those related to packet transmission from the eNB to the core network, including a General Packet Radio Service (GPRS) Tunneling Protocol (GTP) function.

The application server table storage unit 301 stores an application server table. The application server table includes information about application servers that request the eNB to provide location information about the device, QoS information, etc. More specifically, the application server table includes a destination IP address, a protocol ID, a port number, a message type, etc. of a packet to which location information about the device will be tagged. In addition, the application server table further defines a tagging rule which indicates types of information to be tagged to the packet. Table 1 illustrates an example of an application server table.

TABLE 1

| Destination IP Address | Protocol ID | Port Number | Message Type | Tagging Rule |
|---|---|---|---|---|
| 211.155.99.172 | TCP | 80 | HTTP/REQUEST | 31 |
| 64.233.189.99 | TCP | 80 | HTTP/REQUEST | 17 |
| 202.131.30.83 | TCP | 80 | HTTP/REQUEST | 16 |

The packet examination unit 302 determines whether a packet the eNB receives from the device is matched with information included in the application server table. If any or all of a destination IP address, a protocol ID, a port number, a message type, etc. of the received packet matches that of an application server included in the table, the packet examination unit 302 delivers the received packet and the corresponding tagging rule to the tagging execution unit 303. Table 2 illustrates an example of the tagging rule.

TABLE 2

| Location | 00000001 |
|---|---|
| Location Resolution | 00000010 |
| MS-Display-Size | 00000100 |
| MS-DL-Max-Bandwidth | 00001000 |
| MS-Phone-Type | 00010000 |

Referring to Table 2, types of information to be tagged to the packet are determined according to the tagging rule. For example, if a tagging rule is 31 (i.e., 1+2+4+8+16), this indicates that all types of information in Table 2 are tagged. If a tagging rule is 17 (i.e., 1+16), this indicates that the Location and the MS-Phone-Type are tagged in Table 2.

When a packet fails to find a matched application server, the pattern examination unit 302 sends that packet to the core network interface unit 305. In this case, the eNB only forwards the HTTP request message to the core network.

The tagging execution unit 303 extracts suitable tagging information from the tag information storage unit 304 and inserts the extracted information into the HTTP request message. Table 3 illustrates an example of a header of an HTTP request message into which the Location, the Location Resolution, and the MS-DL-Max-Bandwidth (i.e., a bandwidth of wireless environment between the device and the eNB) are inserted.

TABLE 3

GET/INDEX.HTMHTTP/1.1
Accept-language:ko
Accept:*/*
Referer:http://www.samsungmobile.com/ParkingLotLocator.html
User-Agent:Mozilla/4.0
UE-Location:126.5937.340
Location-Resolution:100m
UE-MAX-DL-Bandwidth:10Mbps When the HTTP request message is changed in length and content by insertion of the additional information, the tagging execution unit 303 reproduces the packet by re-determining some fields such as checksum and length of a TCP header and an IP header. The reproduced packet with tag information is then delivered to the core network interface unit 305.

The tag information storage unit 304 provides many types of information necessary for tagging. In an exemplary implementation, some types of information such as QoS information about a wireless environment between the device and the eNB, location information about the eNB, a coverage range, etc. may be offered by the eNB itself. However, other types of information such as a phone type and a display type of the device may need to be received from the device.

Figure 4:
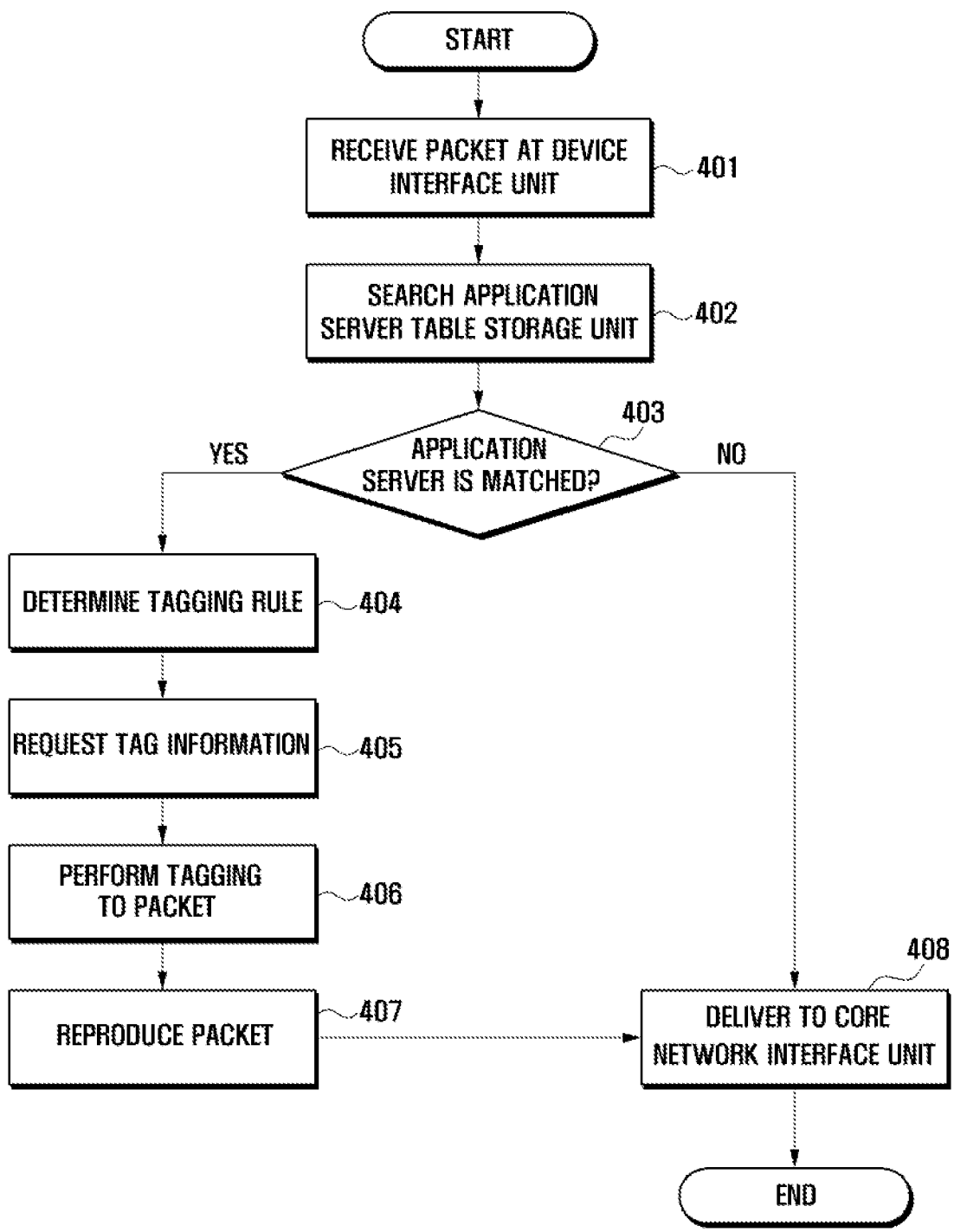
FIG. 4 is a flow diagram which illustrates a method for tagging location information of a mobile device to a message in a wireless communication system according to an exemplary embodiment of the present invention.

FIG. 4 is a flow diagram which illustrates a method for tagging location information of a mobile device to a message in a wireless communication system according to an exemplary embodiment of the present invention.

Referring to FIG. 4, the device interface unit of the eNB receives an HTTP request message from the device and sends the received message to the packet examination unit in step 401.

In step 402, the packet examination unit searches the application server table storage unit. That is, the packet examination unit looks searches an application server table that includes information about application servers which request location information about the device, QoS, etc.

In step 403, the packet examination unit determines if information included in the received HTTP request message matches information stored in the application server table storage unit, and thereby determines whether the received packet requires tagging. In an exemplary implementation, the packet examination unit compares information in the HTTP request message received from the device with information about a certain application server. If one or more of a destination IP address, a protocol Identifier (ID), a port number, a message type, and so forth contained in the HTTP request message matches that of a certain application server in the table, the packet examination unit delivers the message and the corresponding tagging rule to the tagging execution unit and proceeds to step 404.

That is, if it is determined in step 403 that an application server is matched, the tagging execution unit analyzes the tagging rule delivered from the packet examination unit and determines types of information to be tagged to the HTTP request message in step 404. As discussed above, types of information to be tagged may include location information, a location resolution, a bandwidth of wireless environment, and so forth.

In step 405, the tagging execution unit requests and receives suitable information to be tagged to and from the tag information storage unit.

The tagging execution unit tags information, received from the tag information storage unit, to the HTTP request message in step 406. That is, tagging information is inserted into the HTTP request message.

Accordingly, as the HTTP request message is changed in length and content by tagging, the tagging execution unit reproduces the HTTP request message by re-determining some fields such as checksum and length of TCP header and IP header in step 407.

The tagging execution unit sends the reproduced HTTP request message to the core network interface unit in step 408.

On the other hand, if it is determined in step 403 that an application server is not matched, the pattern examination unit sends the received HTTP request message directly to the core network interface unit.

Exemplary embodiments of the present invention may be favorably applied to routers in a wired communication network as well as base stations in a wireless communication network. If this invention is applied to routers connected in a Local Area Network (LAN), a user may share in the benefits of location-based services even in wired communication network environments.

Moreover, exemplary embodiments of the present invention may be also applied to mobile devices. In this case, the mobile device itself determines whether a service request message will be sent to an application server, and performs a tagging process. Therefore, the device should be able to extract information necessary for tagging. That is, it should be possible to determine which application server provides a service based on the device location and further to retrieve tagging rules corresponding to the respective application servers. In addition, the device should be able to obtain its own location. For this, the device may have a GPS module or any other location measuring module therein. Here, the base station may merely deliver the received service request message to the application server.

While this invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A location information tagging method for a location-based service (LBS) in a wireless communication system, the method comprising:
   determining whether a service request message received from a device is being sent to an application server providing the LBS;
   if it is determined that the service request message is being sent to the application server, determining a list of information based on a tagging rule indicating information required for the application server to provide the LBS;
   tagging at least one value to the service request message according to the determined list; and
   transmitting the service request message with the tagged at least one value to the application server.

2. The method of claim 1, wherein the information required from the application server comprises at least one of a location about a device, a location about a base station, a location resolution, a bandwidth, a terminal type or a display size of a terminal.

3. The method of claim 1, wherein the transmitting of the service request message includes reproducing the service request message by considering the tagged at least one value.

4. The method of claim 1, wherein the determining whether the service request message is being sent to the application server includes comparing information contained in the service request message with information about the application server.

5. The method of claim 4, wherein the information about the application server comprises at least one of a destination Internet Protocol (IP) address, a protocol Identifier (ID), a port number, a message type or a tagging rule.

6. The method of claim 1, wherein the determining the list of information includes finding the tagging rule based on a destination of the service request message and information about the application server.

7. The method of claim 1, wherein the tagging at least one value includes making at least one of entities inside of the service request message according to the determined list and inserting value into each of the entities.

8. A location information tagging apparatus for a location-based service (LBS) in a wireless communication system, the apparatus comprising:
   an application server table storage unit for storing information about an application server providing the LBS;
   a packet examination unit for determining whether a service request message received from the device is being sent to the application server; and
   a tagging execution unit for determining a list of information based on a tagging rule and tagging at least one value to the service request message according to the determined list, if it is determined that the service request message is being sent to the application server, wherein the tagging rule indicates information required for the application server to provide an LBS and the service request message.

9. The apparatus of claim 8, further comprising:
   a tag information storage unit for storing at least one of a location about a device, a location about a base station, a location resolution, a bandwidth, a terminal type or a display size of a terminal.

10. The apparatus of claim 8, wherein the packet examination unit detects the application server by comparing the information stored in the application server table storage unit with information contained in the service request message.

11. The apparatus of claim 8, wherein the tagging execution unit reproduces the service request message by considering the tagged at least one value.

12. The apparatus of claim 8, wherein the tagging execution unit finds the tagging rule based on a destination of the service request message and information about the application server.

13. The apparatus of claim 8, wherein the tagging execution unit makes at least one of entities inside the service request message according to the determined list and inserts value into each of the entities.

* * * * *